United States Patent [19]

Feller

[11] Patent Number: 4,581,943

[45] Date of Patent: Apr. 15, 1986

[54] ORBITAL-BALL FLOW SENSORS

[75] Inventor: Murray F. Feller, Citrus County, Fla.

[73] Assignee: Wilgood Corporation, Dunellon, Fla.

[21] Appl. No.: 677,873

[22] Filed: Dec. 4, 1984

Related U.S. Application Data

[63] Continuation-in-part of Ser. No. 501,810, Jun. 7, 1983, abandoned.

[51] Int. Cl.[4] .............................................. G01F 1/32
[52] U.S. Cl. .............................. 73/861.05; 73/861.32; 73/861.77; 331/65
[58] Field of Search ........... 73/861.05, 861.32, 861.77, 73/861.78, 255; 361/285; 331/65

[56] References Cited

U.S. PATENT DOCUMENTS

| | | | |
|---|---|---|---|
| 3,381,531 | 5/1968 | Arutjunov et al. | 73/861.32 |
| 3,443,432 | 5/1969 | Shonin et al. | 73/861.32 |
| 3,455,162 | 7/1969 | Michiver et al. | 73/861.78 |
| 4,157,660 | 6/1979 | Spacek | 73/255 |
| 4,324,144 | 4/1982 | Miyata et al. | 73/861.77 |
| 4,462,262 | 7/1984 | Kahnke | 73/861.05 |

Primary Examiner—Donald O. Woodiel

[57] ABSTRACT

The disclosed flow sensor includes a pipe segment forming a flow passage, having vanes that cause the entering liquid to spiral in passing through a flow-detection zone. An orbital ball is captive in the zone, orbiting in proportion to the flow velocity. A localized capacitive flow detector and a companion capacitive electrode sense the orbiting of the ball. The capacitive electrodes are coupled to the frequency-determining portion of a feedback-stabilized oscillator whose output is modulated each time the ball travels past the sensing electrode. A feedback-stabilized oscillator having a sensing coil is similarly modulated by the effect of a vaned rotor moving past the coil. Different forms of feedback having a long-time-constant maintain high sensitivity of the oscillator to the effect of the flow-activated device.

22 Claims, 5 Drawing Figures

ORBITAL-BALL FLOW SENSORS

This application is a continuation-in-part of abandoned application Ser. No. 06/501,810 filed June 7, 1983.

The present invention relates to apparatus for sensing the flow of fluid.

In one respect, the invention relates to orbital-ball flow sensors, particularly the type in which there is a spiral flow pattern along a pipe and around its axis, causing a ball to orbit about the pipe's axis, and a detector to measure the orbiting frequency. It has been proposed to make the ball of magnetic material, to be used with a magnetic pick-up on the wall of the pipe opposite to the orbital path. Balls of such material may be subject to attack by some fluids. Also, the accuracy of a flow meter that depends on interaction of a magnetized element and an intermittently opposed magnetic element may suffer at low flow rates because of the attraction between them. Moreover, it may be important to match the buoyancy of the ball to a liquid, a difficult specification to meet when the material chosen must also meet the magnetic material requirement. An orbital ball that is magnetic or electrically conductive may also be sensed by a high-frequency-excited coil; but once again, such a constraint on the selection of a suitable material for the ball represents a severe hahdicap at best and may not be feasible in connection with other constraints. Where the ball orbits about the axis of the flow path, access to the ball for sensing is restricted and satisfactory sensing is difficult.

Pursuant to a feature of the present invention, a novel orbital-flow sensor is provided in which sensing access to the orbital ball is attained using a single capacitive sensing electrode. This sensing electrode with a companion electrode form a capacitance connected to a frequency-determining portion of an oscillator. When the orbital ball traverses the space near the sensing electrode, a flow-representing pulse is produced. The resulting brief shift in the frequency of the oscillator could be the basis for pulse detection but, in the exemplary apparatus below, flow-representing pulses are derived from amplitude modulation of the otherwise uniform oscillator output. A wide variety of readily available materials may be used for the orbiting ball, notably many plastics, to avoid or ameliorate many of the problems and limitations of orbital-ball flow sensors that depend on magnetic or metallic substances. Matching the buoyancy of the ball approximately to the density of the liquid is facilitated, important where slow flow rates are to be monitored. Immunity of a ball to attack by certain liquids is easily satisfied where plastics can be used for the ball. The novel flow sensors can be of low-cost construction, and they can be highly stable.

The normal effect of the orbital ball on the oscillator is to cause a momentary dip in the oscillations. This may be due to losses in the ball causing momentary loading of the oscillator or due to a momentary shift in frequency of the oscillator. The dips in the oscillations become flow-representing pulses when the modulated signal becomes demodulated. The modulation of the oscillator by the ball is prominently dependent on the difference between the loss and dielectric characteristics of the orbiting ball and those of the fluid. The amplitude of the demodulated output can be indicated so that change from one flowing fluid to another can be signalled, and so that flow of any particular fluid in a known list can be identified. Thus, salt water, fresh water, oil and air produce successively weaker flow-representing signals in the novel orbital ball flow detector. Such an identification of the fluid is useful, for example, where fluid being pumped out of an oil well or out of a ship's storage tank, etc. cannot be observed conveniently and where the flowing fluid may change from oil to salt water.

In the illustrative orbital ball flow detector detailed below, an oscillator is amplitude-modulated by an orbital ball of dielectric material as it cycles past the capacitive sensing electrode. The oscillator could operate at any point in its characteristic between one extreme where oscillation is a maximum and the opposite extreme where the oscillation is reduced and may even cease. Among the parameters effecting the operating point of the oscillator are various circuit impedances, and the bias on the amplifier that forms part of the oscillator. A further feature of the invention resides in increasing the response of the oscillator to the ball and stabilizing its operation by including a long-time-constant feedback loop to control a parameter of the oscillator. The long-time-constant feedback loop sets and maintains the oscillator at a desired moderate level of operation at which the flow-representing signals are high and, due to the feedback loop, the oscillator is self-stablized at that level. The stabilizing feedback loop adjusts the operating parameter of the oscillator slowly, avoiding feedback of the flow-representing modulation.

The stabilized oscillator as part of an orbital ball flow detector detailed below, with a capacitive electrode as the ball sensor, represents an exemplary flow detector. However, the stabilized oscillator may also be used to advantage as part of flow detectors having other flow-activated devices such as a vaned rotor and with various sensors in proximity to the flow-activated device such as a pick-up coil.

The oscillator's operating level is controlled by bias feedback in one form of flow detector detailed below. There, a rectifier and long-time-constant filter at the oscillator's output provide self-adjusting bias to the amplifier in the oscillator. In a further embodiment of the stabilized flow detector, the feedback-controlled parameter of the oscillator depends on a gain-limiting impedance, and a long-time-constant feedback loop provides stabilized adjustment of that impedance.

In both forms of stabilizing control of the oscillator, the illustrative feedback loops include a capacitor. In case the capacitor is large, its dimensions could be a handicap where a compact flow detector is wanted. In an alternative feedback loop, the requisite long-time-constant depends on a thermal mass instead of the capacitor.

The nature of the invention in its various asepcts, and its further attributes and advantages, will be best appreciated from the following detailed description of an illustrative embodiment of the invention which is shown in the accompanying drawings, and the related discussion appearing below.

Figure 1:
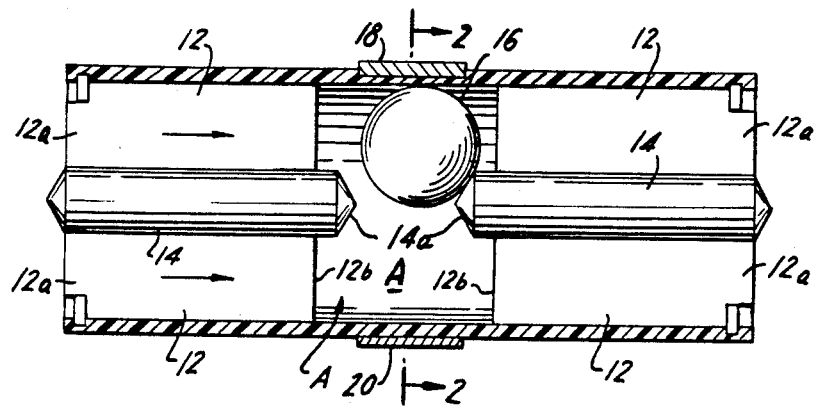
FIG. 1 is a longitudinal cross-section of a novel orbital-ball flow-sensing unit, being a component of the illustrative flow sensor.
Figure 2:
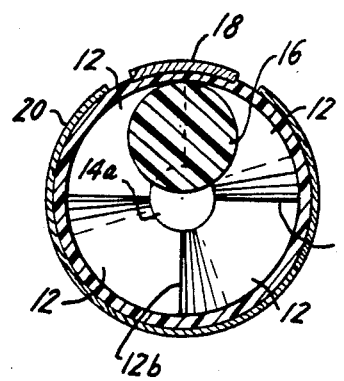
FIG. 2 is a cross-section of the unit in FIG. 1 at the plane 2—2 therein.

In FIGS. 1 and 2, a short length or segment 10 of cylindrical pipe is shown, having two sets of stationary vanes 12 that are shown diagrammatically in FIG. 1, but, as indicated in FIG. 2, the vanes are contoured as roughly spiralled surfaces. These vanes have remote edges 12a at the opposite ends of the unit and proximate edges 12b at the entry and exit of orbital zone A. Preferably the vanes are parallel to the pipe axis at remote edges 12a and are contoured so as to be slant or spiral surfaces entering and leaving zone A. However, for manufacturing convenience the vanes may be spiralled uniformly from end to end. In any case, the entering set of vanes induces the liquid to twist as it enters, traverses and leaves zone A. The unit is symmetrical end-to-end, so that either set of vanes can serve as the entering set and the other is the exiting set of vanes. The flow pattern has a component along the pipe and a spinning component about the pipe axis in zone A.

Rods 14 along the pipe axis unite the radially innermost edges of each set of vanes 12. Rods 14 have conical spaced-apart ends 14a in zone A. Ball or sphere 16 of dielectric material such as polypropylene is disposed in zone A, this ball being large enough to be captive between the inner cylindrical surface of the pipe and one rod-end 14a while providing clearance from the other rod-end 14a.

Liquid entering the pipe section from the left creates a spiral or twist-flow pattern in zone A, causing the ball 16 to move orbitally around the pipe axis. Additionally, the flow pattern presses the ball both against the right-hand rod end 14a and against the inner cylindrical surface of the pipe section. The ball is induced to orbit by a component of the twist-flow pattern of the liquid. The rate of orbiting is remarkably proportional to the rate of liquid flow, over a very wide range of flow rates. The ball, lubricated by the liquid, rolls along both of the surfaces against which it bears. This characteristic extends to very low flow velocities, where there is only light bearing pressure of the ball against its restraining surfaces. Accurate proportionality of orbiting and the liquid flow rate at low flow rates is enhanced by matching the buoyancy of the ball to that of the liquid, at least approximately.

The orbital ball flow detector as described thus far is effective not only for detection of flowing liquid, but also for detection of the flow of gas such as air. However, when the apparatus is used in detection of airflow, and particularly where the apparatus is required to respond to slow flow rates, the orbital axis should ideally be vertical. For high flow rates, if the axis is vertical, the air should flow downward past the orbital detection zone.

Figure 3:
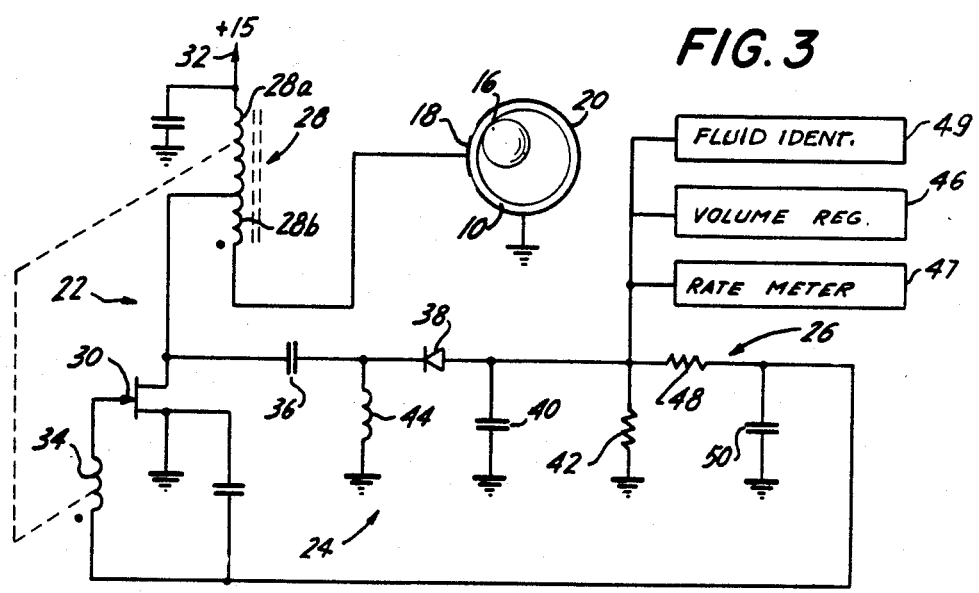
FIG. 3 is a diagram of the entire illustrative embodiment of FIGS. 1 and 2 and the related wiring diagram.

The orbital ball structure of FIGS. 1 and 2 includes a localized sensing electrode 18 and a grond-return electrode 20 that are connected to a resonant circuit of an oscillator as shown in FIG. 3. Sensing electrode 18 is mounted on the wall of plastic pipe, and occupies a narrow arc opposite the orbital path of the ball. Preferably electrode 18 is set into the pipe's wall if the liquid pressure is moderate and limited thinning and weakening of the wall can be tolerated. The inner surface of the pipe is intact and prevents any possible chemical attack of the liquid on the metal electrode. (Of course, if there were no concern about exposing the metal electrode to the liquid, electrode 18 could be flush with the cylindrical surface in zone A.) As another alternative, electrode 18 could also be formed as an insert threaded into the wall of the pipe, with a thin cover if needed to protect the metal electrode from exposure to the liquid In any case, electrode 18 is located close to the orbital path of ball 16.

Ground-return electrode 20 extends around the pipe opposite the orbital path of the ball, spaced away from the outline of electrode 18. As an alternative, ground-return electrode 20 can take the form of a metal band encircling the plastic pipe upstream or downstream of zone A. That metal band or two metal bands can even be located at an end or at both ends of the pipe segment shown. If the pipe were of metal, it would become the ground-return electrode and then electrode 18 would be mounted as a threaded insert in the pipe, with appropriate insulation surrounding electrode 18 and spacing it from electrode 20 as in the form of construction shown.

The circuit of FIG. 3 is provided for detecting the orbiting of ball 16. It includes an oscillator 22, a pulse-detection portion 24, and an oscillation-controlling bias generator 26. Because ball 16 is pressed against the inner surface of the pipe (or other guide surface) as it orbits, the effect of the ball on the oscillator is high and consistent.

Oscillator 22 includes a tank coil 28 of high Q, for example of the type having a ferrite core. In an example the coil has a Q of over 100 at 2 MHz. Field-effect transistor (FET) 30 has its drain connected to the tap in coil 28 and it is energized through coil section 28a by a filtered d-c terminal 32. Section 28b of the tank coil is connected to electrode 18. The source electrode of FET 30 is grounded. The gate of the FET is connected to a tickler or regenerative feed-back coil 34 that is inductively coupled to tank coil 28. The resonant frequency is determined essentially by the inductance and distributed capacitance of coil 28, the stray capacitance and electrodes 18, 20. Because the latter form the only discrete resonant-circuit capacitance, the effect of ball 16 is prominent.

Pulse-detection circuit 24 includes a coupling capacitor 36, choke 44 as an output impedance, series diode rectifier 38 and a pulse-output circuit comprising capacitor 40 and load resistor 42. The time constant of R/C filter portion 40, 42 of detector or amplitude demodulator 24 is short enough to respond to the flow-representing impulses that develop, as described below. The flow-representing pulses are utilized in a volume register 46 which accumulates pulses and a flow-rate meter 47 which responds to the pulse frequency.

It has been noted above that the pulse amplitude varies with varied fluids. Decreasing pulse amplitudes are produced with fluid changes, for example from salt water to fresh water to oil and to air. Accordingly, different fluids that flow past the flow-activated ball can be identified by an amplitude indicator 49, calibrated in advance for each of a series of fluids. Such an indicator is useful to identify oil, for example, as it is pumped out of an oil well or out of a storage tank, and to signal a change when the oil is depleted and salt water begins to flow. The fluid that flows may be concealed or it may be awkward to observe the fluid, and yet it may be important to be alerted to a change of the kind of fluid that flows. This apparatus may be used to signal a change of the fluid that flows (apart from identification of the fluid) and, in that case, indicator 49 need only respond differently to different pulse amplitudes.

Bias generator 26 provides a self-stabilizing bias for FET 30 such that, with ball 16 at rest, the FET operates as a class A amplifies and the oscillator operates at a sustained, self-adjusting moderate level. If the bias on the FET gate were zero, the gain would be very high and correspondingly the oscillation amplitude would be a maximum. With increased bias the gain would decrease and oscillation could even cease.

Oscillation commences and tends to rise to the maximum when the power is first turned on; but as this occurs, the bias feedback adjusts the oscillator to a lower level. It establishes an operating level such that the oscillator is sensitive to ball 16, i.e., orbiting of ball 16 develops considerable amplitude modulation of the oscillations.

Low-pass R/C filter 48, 50 converts the output of the rectifier (with its load 40, 42) into a steady bias, whether there are any pulse-representing pulses or not. The time constant of filter 48, 50 is extremely long. It provides bias that is stable over a long period, longer than the period of flow-representing pulses at the slowest flow rate to be monitored, so that flow-representing pulses do not appear as bias applied to FET 30 by the feedback loop. The feedback loop stabilizes a production run of such flow detectors initially despite varied components used in different flow detectors of a series that are ostensibly alike and it provides long-term stabilization of such flow detectors. For example, resistor 48 is 10 megohms and capacitor 50 is 10 uFd. For comparison, the time constant of the detector load is short, resistor 42 being 100,000 ohms and capacitor 40 being 0.01 uFd in an example. The bias developed by the rectifier and circuit 26 is connected to the FET gate via tickler 34.

So long as ball 16 remains at a fixed position (whether in or out of proximity to electrode 18) the oscillator generates a moderate level of oscillation. The oscillator output to detection circuit 24 develops a rectified d-c voltage that becomes a stabilized bias stored in capacitor 50. With the ball at rest, a constant capacitance shunts tank coil 28 of the oscillator. The oscillator operates at constant frequency. High-frequency losses at tank coil 28 and at electrodes 18, 20 limit the Q of the resonant circuit as a constant load on the amplifier, which operates at a stable, moderate level.

As the ball sweeps into and out of proximity to capacitive electrode 18, there is a change in the dielectric loss associated with sensing electrode 18 because of a presumed difference between the loss factors of the ball and the fluid. Additionally, the frequency of the oscillator changes as the ball sweeps past electrode 18 due to a presumed difference between the dielectric constants of the ball and the fluid; and when the frequency shifts, the losses in the oscillator change, probably due to a varying Q of the tank coil at different frequencies. Over-all, there is an abrupt decrease in the amplitude of oscillation as the ball sweeps past sensing capacitive electrode 18, and this modulation is detected in circuit 24. The shift in frequency and the related shift in losses are enhanced by making the capacitance at electrodes 18, 20 as large as practical in proportion to the total frequency-determining capacitance in the resonant circuit, i.e., by omitting any discrete shunt capacitor across coil 28. The resonant circuit of the oscillator is characteristically a low-capacitance circuit.

The self-adjusting bias establishes a critical condition in the oscillator that creates large flow-representing output pulses when the ball traverses electrode 18, without resort to complex circuits and in a manner that is highly stable and provides excellent immunity to spurious signals. In an example, using a polypropylene ball 16 of ⅜-inch diameter in a ¾-inch inner pipe diameter, using a ¼-inch diameter electrode 18 acting through a locally thinned polypropylene or polysulfone wall 0.02-inch thick, at a frequency of about 10 MHz, with water flowing in the pipe, flow-representing pulses of 0.5 Volt, peak-to-peak were produced at the input to register 46.

The frequency change which occurs as ball 18 sweeps past electrode 18 can also be detected as a means for signalling the orbits of the ball. Such a change would use the oscillator described, or its equivalent, with a low-capacitance resonant circuit. However, the illustrative amplitude-modulated pulse detection circuit is more economical, it is capable of producing strong flow-representing output pulses, and it has proved to be generally quite successful. Other forms of oscillators using low-capacitance resonant circuits are also contemplated, such as R-C oscillators having frequency- or phase-shift detectors for providing the flow-representing signals.

Figure 4:
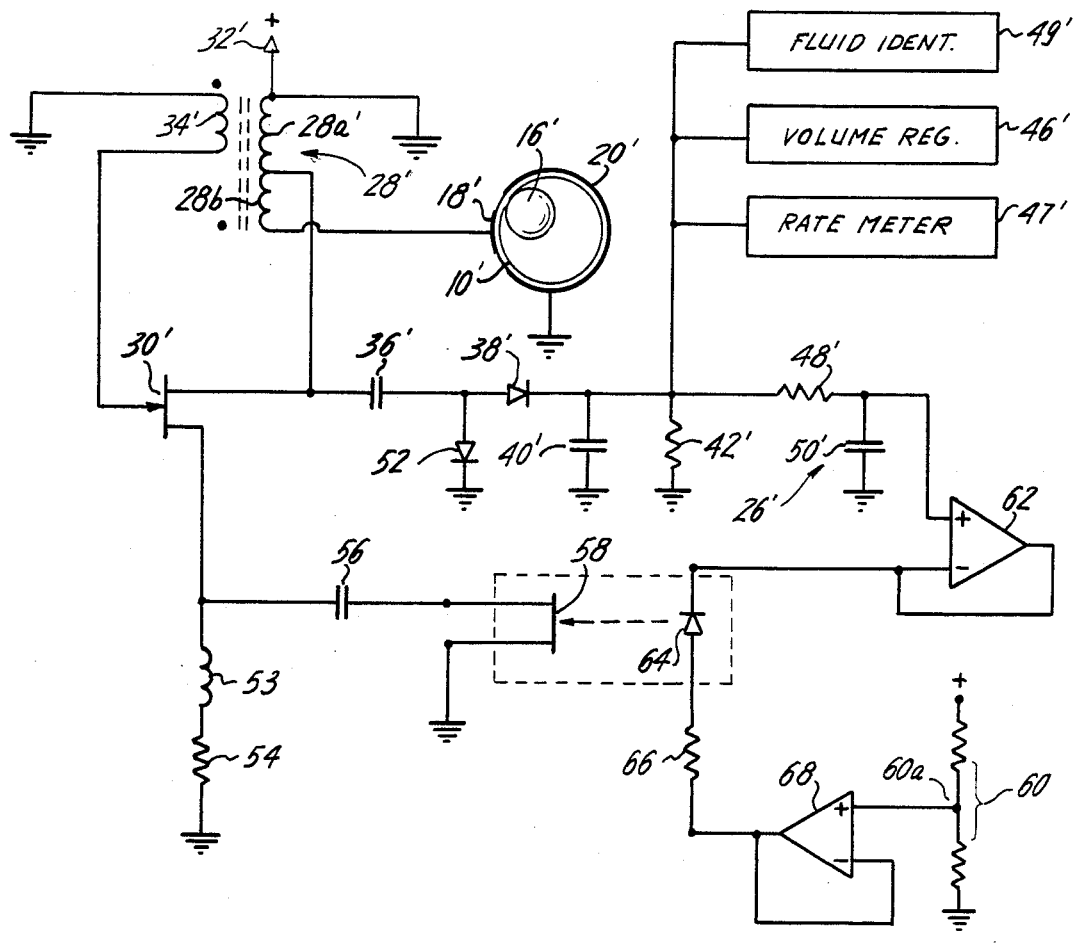
FIG. 4 is a modification of the embodiment of FIG. 3.

A modification of the flow detector of FIGS. 1–3 is shown in FIG. 4. Primed numerals are used in FIG. 4 to designate parts corresponding to those of FIGS. 1–3, so that the above detailed description applies as well to FIG. 4 except for the differences below.

In FIG. 4, the choke 44 of FIG. 3 is replaced by a diode 52, polarized to act with diode 38' for providing rectified voltage-doubled output of the oscillator to both the flow indicators 46', 47' and 49' and the feedback loop to be described.

Diode 52 of FIG. 4 may be used in a modification of FIG. 3 to replace choke 44. The change is advantageous where voltage doubling of the oscillator's output is desired in the feedback loop to provide increased feedback bias.

Reverting to FIG. 4, the source electrode of FET 30' is returned to ground through a high-frequency impedance path consisting of choke 53 and resistor 54 in series. A bypass path, shunting impedance 53, 54 consists of capacitor 56 in series with photoresponsive FET 58 that is also returned to ground. If the resistance of FET 58 were to be reduced to zero, then the source electrode of FET 30' would be zero, and oscillations would approach a maximum, at saturation. However, the resistance of FET 58 is quite high when it is in the dark.

Voltage divider 60 between (+) and ground develops a reference voltage at junction 60a. A series circuit extends between the output of long-time-constant filter 48', 50' and voltage reference 60a, comprising unity-gain operational amplifier 62, light-emitting diode 64, resistor 66 and unity-gain amplifier 68, connected as shown. The d-c signal across diode 64 and resistor 66 at the outputs of amplifiers 62 and 68 represents the difference between the voltage at reference 60a and the rectified and long-time-averaged output of the oscillator. Photosensitive FET 58 and LED 64 is a unit, commercially available as type H11F1 made by General Electric.

When power is first applied, the output of amplifier 62 is at ground potential so that a considerable voltage develops across light-emitting diode 64 and resistor 66. This results in a high level of light output from diode 64 and sharply reduced resistance in photosensitive FET 58. The oscillations of the oscillator, accordingly, approach a maximum. As this occurs, the oscillator output gradually develops d-c output at long-time-constant filter 48', 50'. This input to amplifier 62 reduces the voltage difference across LED 64 and resistor 66, decreasing the light from LED 64 to light-sensitive FET 58 and reducing the resistance of the shunt path across impedance path 52, 54. This, in turn, limits the rise of oscillations to a stable desired level at which the oscillator is quite sensitive to—and modulated by—orbiting ball 16'. The long-time-constant feedback loop thus controls the ground-return impedance of the source electrode as the oscillator's controlled parameter.

Figure 5:
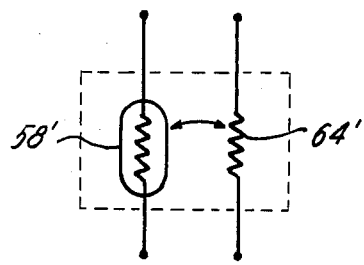
FIG. 5 is a modification of a portion of FIG. 4.

In common with FIG. 3, the circuit of FIG. 4 relies on the long time constant of filter 48', 50' which, in practical terms, depends on a storage capacitor 50'. The dimensions of capacitor 50' tend to be significantly large, particularly where an electrostatic capacitor is used for its superior storage properties. The circuit apparatus of FIGS. 3 and 4 may be made quite compact, where required, by using an integrated circuit, but the dimensions of capacitor 50' (or 50) would be a limitation. FIG. 5 shows a modified circuit portion. A thermistor 58' that is close-coupled to heater 64 is connected in FIG. 4 in place of FET 58 and LED 64. Thermistor 58' and its heater 64' incorporate an effectively large thermal mass having limited thermal coupling to heater 64'; and in this circuit, heater 64' may be tiny. In this way, thermistor 58' and its heater 64' can be used to impart a long time constant to the feedback loop, and filter 48', 50' may be omitted.

The detector's time constant is short enough for the detector to respond to the flow-representing pulses but it is, as usual, much longer than the period of the oscillator's carrier frequency. In turn, the time constant of the feedback loop is much longer than that of the detector, and much longer than the period of the flow-representing pulses, even at the lowest flow rates to be monitored.

The orbital ball flow detector for a cylindrical flow passage (FIGS. 1 and 2) including an oscillator having a capacitive ball sensing electrode, represents a distinctive feature of the invention. That form of flow detector and others are improved by stabilizing the oscillator with a long-time-constant feedback loop. Such a stabilized oscillator is effective with a capacitive sensor in close proximity to a flow-activated ball and other flow-activated devices, e.g. a vaned rotor of dielectric material. The described feedback-stabilized oscillators are also effective as part of a flow detector in which the sensor for the flow-activated device is a coil forming a modulating portion of the oscillator, directly in the oscillator or coupled to it.

The nature of the invention will be readily understood from the foregoing detailed description of an illustrative embodiment which is shown in the accompanying drawings. However, it is readily subject to various changes by those skilled in the art. Accordingly, the invention should be construed broadly, consistent with its true spirit and scope.

I claim:

1. Apparatus for sensing the flow of fluid, including means defining an essentially direct flow passage, vanes in said passage for producing a lengthwise and spiralling pattern of flow in a detection zone of said passage, an orbital ball of dielectric material, means constraining said ball to move in an orbital path in the detection zone, said constraining means including a cylindrical wall portion of said passage-defining means and a member within and coaxial with said cylindrical wall portion, the ball being proportioned so that it is captive between the inner surface of the cylindrical wall portion and said coaxial member and so that the ball is pressed by flowing fluid against said inner surface and said coaxial member, capacitive ball-sensing means including a capacitive sensing electrode fixed to said wall portion against which the orbital ball is pressed in close proximity to said orbital path and including companion capacitive electrode means, an oscillator having frequency-determining circuit means incorporating said capacitive ball-sensing means, and output circuit means for detecting shifts in the operation of the oscillator, thereby to provide flow-representing signals corresponding to the orbital travel of the ball past said sensing electrode.

2. Apparatus for sensing the flow of fluid as in claim 1 wherein the traverse of the ball past said capacitive sensing electrode imposes amplitude modulation on the oscillator and wherein said output circuit means includes an amplitude detector.

3. Apparatus for sensing the flow of fluid as in claim 1 wherein a portion of said cylindrical wall portion is of dielectric material and separates said capacitive sensing electrode from said passage.

4. Apparatus for sensing the flow of fluid as in claim 1 wherein said output circuit means is differently responsive to different magnitudes of detected output and includes indicator means representing different output circuit responses.

5. Apparatus for sensing the flow of fluid, including means defining an essentially direct flow passage, vanes in said passage for producing a lengthwise and spiralling pattern of flow in a detection zone of said passage, an orbital ball of dielectric material, means constraining said ball to move in an orbital path in the detection zone, capacitive ball-sensing means including a capacitive sensing electrode disposed opposite to a portion of said orbital path and including companion capacitive electrode means, an oscillator having frequency-determining circuit means coupled to said capacitive ball-sensing means, said apparatus including long-time-constant circuit means energized by the oscillator for regulating the operation of said oscillator at a level rendering it prominently responsive to changes in the field adjacent said sensing electrode, and output circuit means for detecting shifts in the operation of the oscillator, thereby to provide flow-representing signals corresponding to the orbital travel of the ball past said sensing electrode.

6. Apparatus for sensing the flow of fluid as in claim 5 wherein said long-time-constant circuit is arranged to provide the oscillator with a variable amplitude-limiting impedance.

7. Apparatus for sensing the flow of fluid, including means defining an essentially direct flow passage, vanes in said passage for producing a lengthwise and spiralling pattern of flow in a detection zone of said passage, an orbital ball of dielectric material, means constraining said ball to move in an orbital path in the detection zone, capacitive ball-sensing means including a capacitive sensing electrode disposed opposite to a portion of said orbital path and including companion capacitive electrode means, an oscillator having frequency-determining circuit means coupled to said capacitive ball-sensing means, and output circuit means for detecting shifts in the operation of the oscillator, thereby to provide flow-representing signals corresponding to the orbital travel of the ball past said sensing electrode, said oscillator incorporating an amplifier whose gain is prominently variable as a function of applied bias, and said apparatus including a rectifier and a long-time-constant circuit energized by the oscillator for providing bias to the amplifier, for regulating the oscillator at a self-stabilizing level.

8. Apparatus for sensing the flow of fluid, including means defining an essentially direct flow passage, vanes in said passage for producing a lengthwise and spiralling pattern of flow in a detection zone of said passage, an orbital ball of dielectric material, means constraining said ball to move in an orbital path in the detection zone, capacitive ball-sensing means including a capacitive sensing electrode disposed opposite to a portion of said orbital path and including companion capacitive electrode means, an oscillator having frequency-determining circuit means coupled to said capacitive ball-sensing means and including an amplifier whose gain varies in dependence on the applied bias, said oscillator being of a form whose output is amplitude-modulated in response to the travel of the ball past the sensing electrode, and output circuit means for detecting amplitude shifts of the oscillator for thereby providing flow-representing signals corresponding to the orbital travel of the ball past the sensing electrode, said apparatus including a rectifier for detecting amplitude modulation of the oscillator and a long time constant circuit responsive to the rectifier output coupled to the amplifier and providing the amplifier with self-regulating bias, the time constant of said long time constant circuit being much longer than the period of the flow representing signals.

9. Apparatus for sensing the flow of fluid, including means defining an essentially direct flow passage, vanes in said passage for producing a lengthwise and spiralling pattern of flow in a detection zone of said passage, an orbital ball of dielectric material, means constraining said ball to move in an orbital path in the detection zone, capacitive ball-sensing means including a localized capacitive sensing electrode disposed opposite to a portion of said orbital path and including companion capacitive electrode means forming a ground return to the oscillator and having a relatively large extent in the vicinity of said sensing electrode, an oscillator having frequency-determining circuit means coupled to said capacitive ball-sensing means, and output circuit means for detecting shifts in the operation of the oscillator, thereby to provide flow-representing signals corresponding to the orbital travel of the ball past said sensing electrode.

10. Apparatus for sensing the flow of fluid as in claim 9, wherein said oscillator includes an amplifier whose gain is controlled by an applied bias, said apparatus including means for rectifying the output of the oscillator and long-time-constant means for converting the rectified output to a bias that is stable over a longer period of time than said flow-representing signals, and means for impressing said stable bias on said amplifier.

11. Apparatus for sensing the flow of fluid as in claim 9, wherein said capacitive ball-sensing means is the only discrete capacitive means of said frequency-determining circuit.

12. Apparatus for sensing the flow of fluid, including means defining a fluid flow passage, a device in a detection zone in said passage activated cyclically in a circular path by fluid flowing therein, and circuit means for detecting cyclic operation of said device, said circuit means including a sensing element in proximity to a portion of the circular path of the flow-activated device, an oscillator operable variably in dependence on the relationship of said fluid-activated device to said sensing element, means including a long-time-constant feedback loop responsive to the oscillator output for regulating the oscillator at a level of operation at which it is prominently responsive to changes in said relationship, and a detector responsive to the oscillator output for producing a train of pulses representing the cyclic operation of said flow-activated device past said sensing element.

13. Apparatus for sensing the flow of fluid as in claim 12, wherein said feedback loop is a variable bias providing means and wherein said oscillator includes a variable gain amplifier responsive to the bias provided by said feedback loop.

14. Apparatus for sensing the flow of fluid as in claim 13, wherein said bias providing means and said detector include a common rectifier.

15. Apparatus for sensing the flow of fluid as in claim 13, wherein said oscillator includes an amplifier to which said variable bias is provided and wherein the amplifier has operating characteristics that cause decreased amplitude of oscillations of the oscillator in response to increased bias.

16. Apparatus for sensing the flow of fluid as in claim 15, wherein said detector has a time constant much longer than a cycle interval of the oscillator and wherein said feedback loop has a time constant which is much longer than that of said detector.

17. Apparatus for sensing the flow of fluid as in claim 12, wherein said detector has a time constant much longer than a cycle interval of the oscillator and wherein said feedback loop has a time constant which is much longer than that of said detector.

18. Apparatus for sensing the flow of fluid as in claim 12, wherein said flow activated device is a ball and wherein said passage defining means incorporates means for causing said ball to orbit in said circular path.

19. Apparatus for sensing the flow of fluid as in claim 12, wherein said sensing element is a capacitive electrode, wherein said flow activated device is a ball, and wherein said passage defining means includes means for causing the ball to orbit in said circular path and to bear against a portion of said passage defining means in close proximity to the capacitive electrode.

20. Apparatus for detecting the flow of fluids as in claim 12, wherein said feedback loop includes a capacitor contributing prominently to said long time constant.

21. Apparatus for detecting the flow of fluids as in claim 12, wherein said feedback loop includes an electro-thermal means for at least largely imparting the long time constant thereto.

22. Apparatus for detecting the flow of fluids as in claim 12, wherein said fluid activated device is of dielectric material to which the sensing device is distinctively responsive in contrast to the response of the sensing device to fluid in the passage, further including output means differently responsive to different magnitudes of the detector's output as an indication of different fluids flowing in the passage.

* * * * *